United States Patent
Hahn et al.

(10) Patent No.: US 11,593,520 B2
(45) Date of Patent: Feb. 28, 2023

(54) PRIVACY ENFORCING MEMORY SYSTEM

(71) Applicant: Western Digital Technologies, Inc., San Jose, CA (US)

(72) Inventors: Judah Gamliel Hahn, Ofra (IL); Ariel Navon, Revava (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/234,051

(22) Filed: Apr. 19, 2021

(65) Prior Publication Data
US 2022/0335159 A1 Oct. 20, 2022

(51) Int. Cl.
*G06F 21/62* (2013.01)
*G06F 21/78* (2013.01)
*G06F 21/84* (2013.01)

(52) U.S. Cl.
CPC ...... *G06F 21/6254* (2013.01); *G06F 21/6281* (2013.01); *G06F 21/78* (2013.01); *G06F 21/84* (2013.01)

(58) Field of Classification Search
CPC .. G06F 21/6254; G06F 21/6281; G06F 21/78; G06F 21/84
See application file for complete search history.

(56) References Cited

U.S. PATENT DOCUMENTS

| | | | |
|---|---|---|---|
| 8,867,853 B2 | 10/2014 | Migdal et al. | |
| 10,062,406 B2* | 8/2018 | Park | G11B 20/005 |
| 10,791,263 B1* | 9/2020 | Hwang | H04N 5/2254 |
| 10,863,139 B2* | 12/2020 | Mate | H04N 7/1675 |
| 10,887,291 B2* | 1/2021 | Davis | H04L 63/0281 |
| 11,154,223 B2* | 10/2021 | Southerland, III | A61B 5/7292 |
| 2005/0286282 A1* | 12/2005 | Ogura | G11C 15/00 365/120 |

(Continued)

FOREIGN PATENT DOCUMENTS

| | | |
|---|---|---|
| EP | 2429182 A2 | 3/2012 |
| WO | 2016180460 A1 | 11/2016 |

OTHER PUBLICATIONS

Amro Awad, Yipeng Wang, Deborah Shands, and Yan Solihin. 2017. ObfusMem: A Low-Overhead Access Obfuscation for Trusted Memories. SIGARCH Comput. Archit. News 45, May 2, 2017, 107-119. (Year: 2017).*

(Continued)

*Primary Examiner* — Khalid M Almaghayreh
(74) *Attorney, Agent, or Firm* — Patterson & Sheridan, LLP; Steven H. VerSteeg

(57) ABSTRACT

A method and apparatus for enforcing privacy within one or more memories of a data storage system are disclosed. In one embodiment, sensor data containing personally identifiable information (PII) is provided to a memory. In some embodiments, the memory of disclosed systems and methods may be volatile, non-volatile, or a combination. Within the memory, PII is detected in some embodiments by AI-based computer vision, voice recognition, or natural language processing methods. Detected PII is obfuscated within the memory prior to making the sensor data available to other systems or memories. In some embodiments, once PII has been obfuscated, the original sensor data is overwritten, deleted, or otherwise made unavailable.

15 Claims, 5 Drawing Sheets

(56) References Cited

U.S. PATENT DOCUMENTS

| | | | | |
|---|---|---|---|---|
| 2006/0064384 | A1* | 3/2006 | Mehrotra | G08B 13/19686 |
| | | | | 348/E7.086 |
| 2016/0119503 | A1* | 4/2016 | Yamada | G06T 5/004 |
| | | | | 358/3.27 |
| 2016/0203336 | A1* | 7/2016 | Nambiar | G06F 21/6245 |
| | | | | 726/26 |
| 2017/0039387 | A1* | 2/2017 | Leonardi | H04L 63/0414 |
| 2017/0323119 | A1* | 11/2017 | Harp | G06F 21/6254 |
| 2017/0331796 | A1* | 11/2017 | Crofton | H04L 67/1095 |
| 2018/0046855 | A1 | 2/2018 | Ganong et al. | |
| 2019/0102565 | A1* | 4/2019 | Boyd | G06F 3/0623 |
| 2019/0377958 | A1* | 12/2019 | Geiler | G08B 13/19686 |
| 2020/0204563 | A1* | 6/2020 | Simons | G06F 21/64 |
| 2020/0285771 | A1* | 9/2020 | Dey | G06F 21/6272 |
| 2021/0067742 | A1* | 3/2021 | Miki | G06V 20/59 |
| 2021/0319142 | A1* | 10/2021 | Kärkkäinen | G06F 21/54 |
| 2022/0021660 | A1* | 1/2022 | Trieflinger | H04L 9/0897 |

OTHER PUBLICATIONS

International Search Report and Written Opinion for International Application No. PCT/US2022/013358 dated May 9, 2022.

José Ramon Padilla-López, et al., "Visual Privacy Protection Methods: A Survey," Preprint submitted to Expert Systems with Applications, Feb. 3, 2015, 47 pages.

Namje Park et al., "A Mechanism of Masking Identification Information regarding Moving Objects Recorded on Visual Surveillance Systems by Differentially Implementing Access Permission," Electronics, 2019, 8, 735; doi: 10.3390/electronic 8070735, www.mdpi.com/journal/electronics, 17 pages.

Yupeng Zhang et al., Anonymous camera for privacy protection, 2014 22nd International Conference on Pattern Recognition, DOI 10.1109/ICPR.2014.715, 6 pages.

\* cited by examiner

PRIVACY ENFORCING MEMORY SYSTEM

BACKGROUND OF THE DISCLOSURE

Field of the Disclosure

Embodiments of the present disclosure generally relate to obfuscating personally identifiable information, and more particularly, to obfuscating personally identifiable information in a data storage device.

Description of the Related Art

Advances in artificial intelligence have led to enhanced capability for the identification of people and objects by computers through the use of computer vision, voice recognition, and natural language processing technologies. In many cases, these capabilities exceed the ability of humans. However, these enhanced capabilities of computers cause challenges in the realm of privacy, or more accurately, maintaining the privacy of individuals in accordance with laws, regulations, and social expectations.

The same technologies that can identify people and objects may further be used to modify or obfuscate features of people and objects found in sensor data for which privacy is expected or required. However, in conventional approaches, sensor data is stored in an un-obfuscated form, with obfuscation applied prior to displaying on a user interface. As a result, a malicious user may seek to circumvent obfuscation applications to obtain un-obfuscated data from volatile or non-volatile memories.

What is needed are systems and methods for addressing the shortcomings of conventional approaches.

SUMMARY OF THE DISCLOSURE

The present disclosure generally relates to systems and methods for enforcing privacy within memories of data storage systems. In one embodiment, sensor data containing personally identifiable information (PII) is provided to a memory. In some embodiments, the memory of disclosed systems and methods may be volatile, non-volatile, or a combination. Within the memory, PII is detected in some embodiments by AI-based computer vision, voice recognition, or natural language processing methods. Detected PII is obfuscated within the memory prior to making the sensor data available to other systems or memories. In some embodiments, once PII has been obfuscated, the original sensor data is overwritten, deleted, or otherwise made unavailable.

In one embodiment, a system for enforcing data privacy is disclosed, that includes an input/output coupled to a sensor configured to produce sensor data comprising personal identifying data, an intermediate storage configured to receive sensor data from the sensor; and a blur unit coupled to the intermediate storage and configured to identify personal identifying data of the sensor data, produce obfuscated sensor data by obfuscating at least a portion of the personal identifying data, and provide the obfuscated sensor data to the intermediate storage.

In another embodiment, a system for storing data is disclosed that includes an input/output coupled to a sensor, an intermediate storage (IS), a data storage device, and a processor configured to execute a method for enforcing data privacy. The method includes receiving sensor data from the sensor comprising personal identifying data at the IS, identifying the personal identifying data at the IS, and generating obfuscated sensor data at the IS by obfuscating at least a portion of the personal identifying data.

In another embodiment, a controller for a data storage system is disclosed that includes a memory means for storing computer-readable instructions, and a processor means configured to read computer-readable instructions that cause the processor to execute a method for enforcing data privacy. The method includes receiving sensor data comprising personal identifying information at an intermediate storage (IS) means; obfuscate at least a portion of the sensor data comprising personal identifying information at the IS means, to generate obfuscated personal identifying information; and provide the sensor data to a data storage device (DSD) means.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure generally relates to systems and methods for enforcing privacy within memories of data storage systems. In one embodiment, sensor data containing personally identifiable information (PII) is provided to a memory. In some embodiments, the memory of disclosed systems and methods may be volatile, non-volatile, or a combination. Within the memory, PII is detected in some embodiments by AI-based computer vision, voice recognition, or natural language processing methods. Detected PII is obfuscated within the memory prior to making the sensor data available to other systems or memories. In some embodiments, once PII has been obfuscated, the original sensor data is overwritten, deleted, or otherwise made unavailable.

Figure 1:
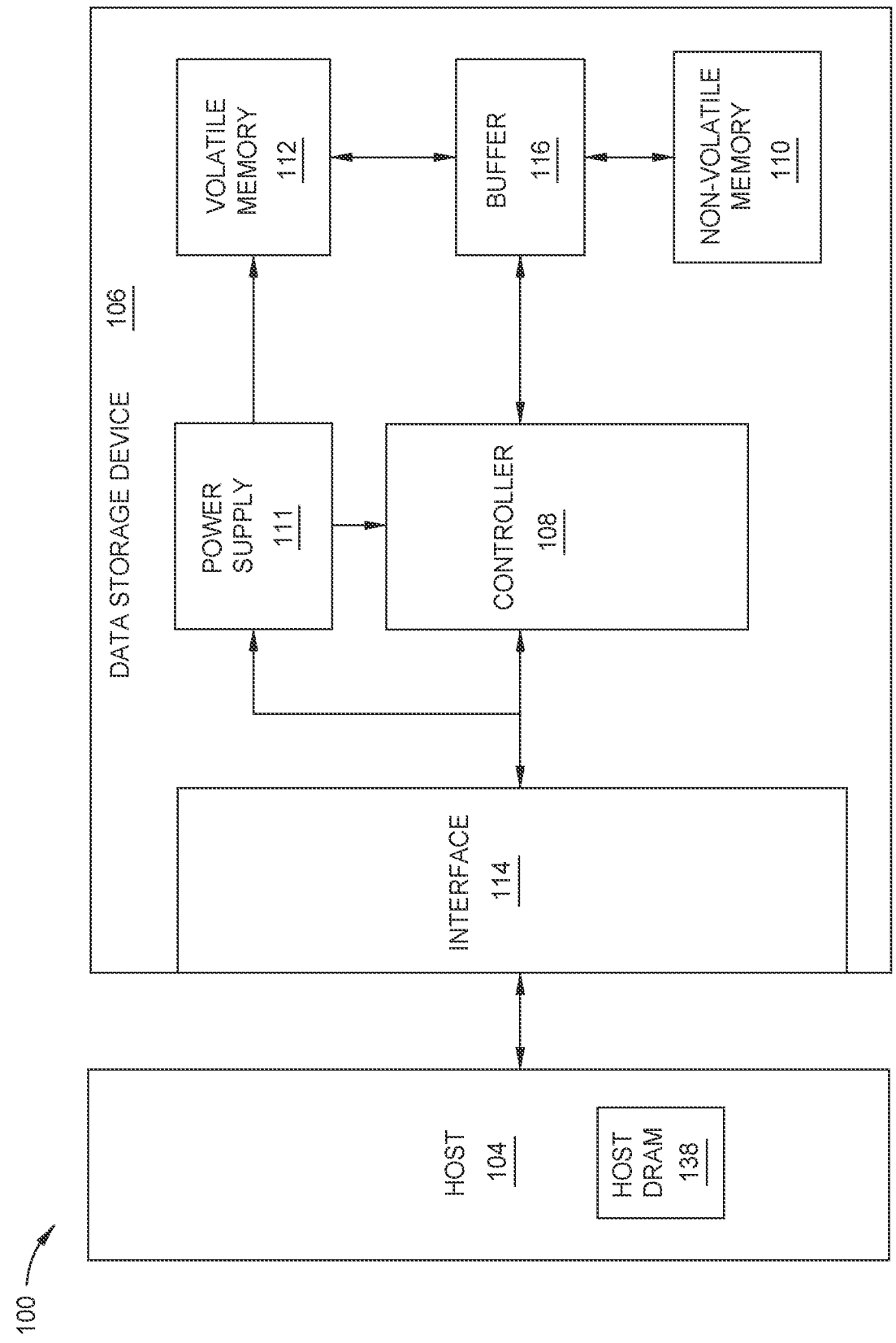
FIG. 1 depicts a schematic block diagram illustrating a storage system in which a data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit of NVM 110 may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). Controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, controller 108 may use volatile memory 112 as a cache. For instance, controller 108 may store cached information in volatile memory 112 until cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
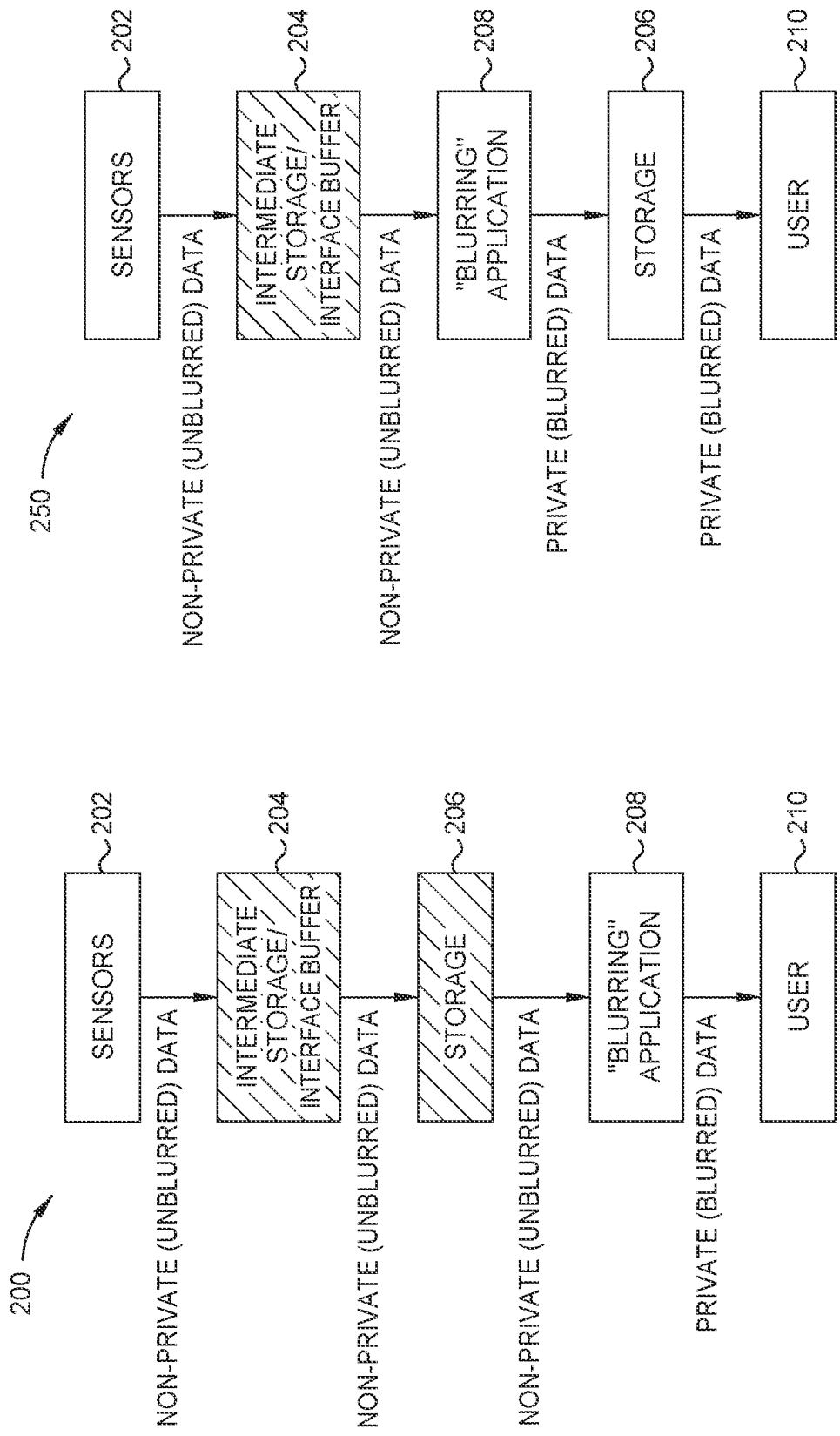
FIG. 2A depicts a schematic block diagram illustrating an implementation of blurring data of a privacy-recording system, according to certain embodiments.
FIG. 2B depicts a schematic block diagram illustrating another implementation of blurring data of a privacy-recording system, according to certain embodiments.

FIG. 2A depicts a schematic block diagram illustrating an implementation of blurring data of a privacy-recording system 200, according to certain embodiments. The system 200 includes one or more sensors 202 coupled to an intermediate storage/interface buffer 204. In one non-limiting example, the one or more sensors 202 may be configured to capture sensor data, such as image data. For example, the one or more sensors 202 may be the sensors of a digital video camera, a digital single-lens reflex camera, a mirrorless interchangeable-lens camera, a hybrid camera, a compact system camera, a surveillance system, a security camera, closed-circuit television camera, and the like.

The sensor data is transferred to the intermediate storage/interface buffer 204 as non-private (unblurred) data, such that the sensor data is unmodified. In the description herein, sensor data may be referred to as image data for exemplary purposes. Rather, private (blurred) data cannot be reconstructed to the original data due to some modification to certain parts of the data. For example, a face is a distinguishable feature of an individual, such that the face may be recognizable to a stranger. In order to protect the privacy (i.e., personally identifiable information (PII)) of the individual, a portion of the image, including the face, may be blurred or obfuscated while the remaining portion of the image not including the face is not blurred. The blurring may be due to a modification of a certain part of the data, where the certain part of the data is associated with image data of the face. In some examples, the intermediate storage/interface buffer 204 is volatile memory, such as the volatile memory 112 of FIG. 1. The volatile memory may be SRAM, DRAM, or other applicable non-power safe memory types. In other examples, the intermediate storage/interface buffer 204 is a portion of non-volatile memory, such as the NVM 110 of FIG. 1. The portion of the NVM may be an SLC buffer dedicated for fast writes and temporary storage of the image data.

The intermediate storage/interface buffer 204 is coupled to a storage unit 206. The image data is transferred to the storage unit 206 from the intermediate storage/interface buffer 204. The storage unit 206 may be a memory device or a data storage device configured to store the image data for long-term storage. The storage unit 206 may be power fail-safe, such that the data stored in storage unit 206 is protected against corruption or errors during an ungraceful shutdown event. When the image data is transferred from the intermediate storage/interface buffer 204 to the storage unit 206, the image data is non-private (unblurred) data. Because the image data stored in the intermediate storage/interface buffer 204 and the storage unit 206 are in the non-private (unblurred) data format, there may be a potential privacy violation, such as when an external entity accesses the intermediate storage/interface buffer 204 and/or the storage unit 206 without permission. In some non-limiting examples, the external entities may be either an individual, a company, or an artificial intelligence (AI) with malicious or unwanted intent.

The storage unit 206 is coupled to a "blurring" application 208. The data streams between the one or more sensors 202 and the intermediate storage/interface buffer 204, the intermediate storage/interface buffer 204 and the storage unit 206, and the storage unit and the "blurring" application 208 may be intercepted during an attack on the data streams, such that PII is gained by the external entity without permission. When the "blurring" application 208 receives the non-private (unblurred) data, the "blurring" application 208 may be configured to determine which parts of the image data to be blurred or obfuscated and blur or obfuscate the identified parts of the image data. The identified parts of the image data may be related to the PII, such that obfuscating the identified parts of the image data relates to corrupting the data or other similar methods of blurring the data. The "blurring" application 208 is coupled to a user 210. The user 210 may be the host device 104 of FIG. 1. The image data is transferred from the "blurring" application 208 to the user 210 in a private "blurred" data format, such that the PII may be protected.

FIG. 2B depicts a schematic block diagram illustrating another implementation of blurring data of a privacy-recording system 250, according to certain embodiments. Aspects of the privacy-recording system 250 may be similar to the aspects of the privacy-recording system 200. Thus, for simplification, common reference numerals are utilized in the privacy-recording system 250 as the privacy-recording system 200, and the description of each aspect is hereby incorporated. Rather than transferring the non-private (unblurred) data to the storage unit 206, such as in the privacy-recording system 200, the non-private (unblurred) data is transferred to the "blurring" application 208 prior to the image data being transferred to the storage unit 206. Rather than having three data streams transferring and two memory locations storing the non-private (unblurred) data, the privacy-recording system 250 only has two data streams transferring and one memory location storing the non-private (unblurred) data. However, the external entity may still gain access to the privacy-recording system 250 and obtain PII without permission.

Figure 3:
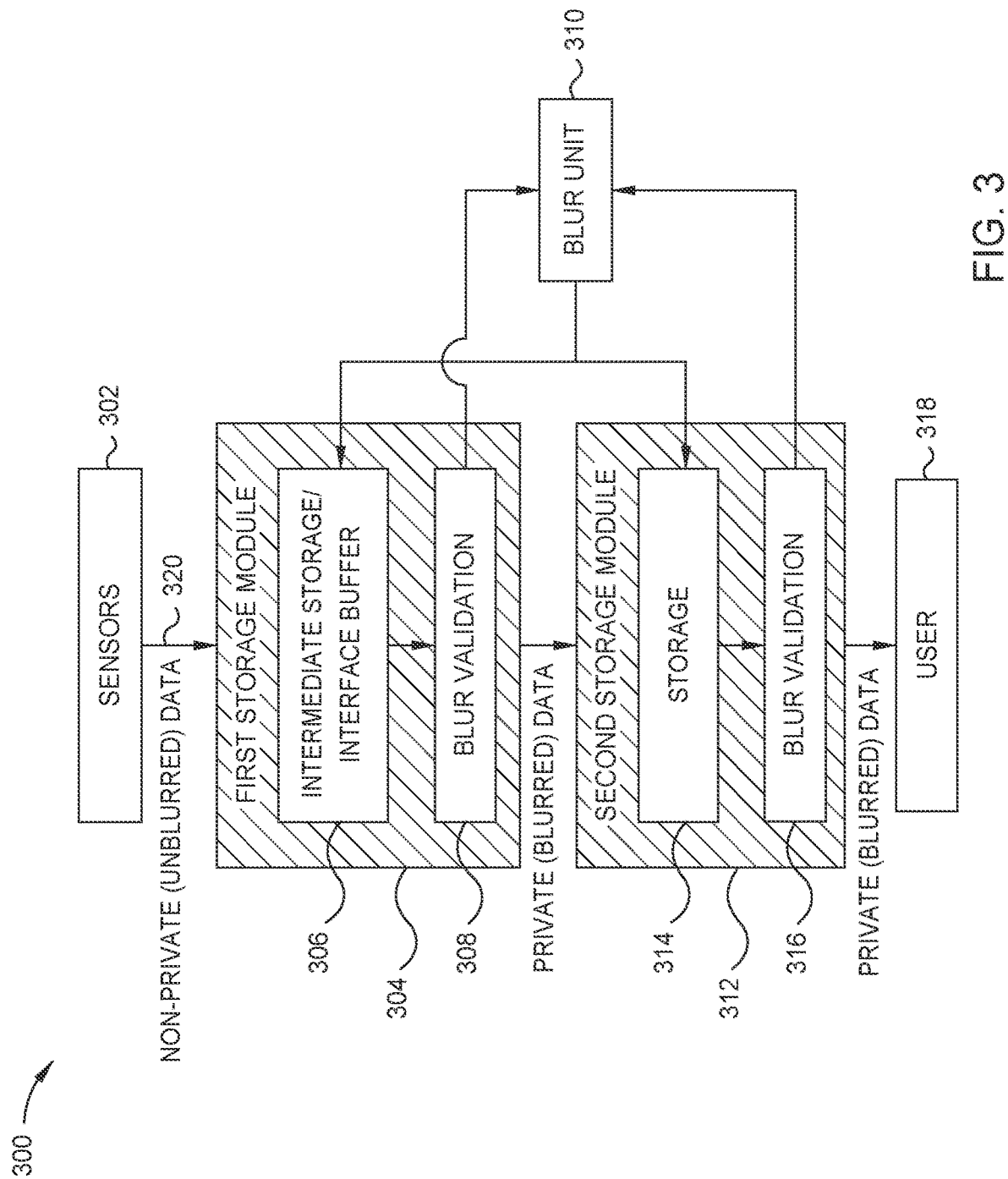
FIG. 3 depicts a schematic block diagram illustrating a memory-level read blocking of unblurred data system, according to certain embodiments.

FIG. 3 depicts a schematic block diagram illustrating a memory-level read blocking of unblurred data system 300, according to certain embodiments. The memory-level read blocking of unblurred data system 300 includes one or more sensors 302, a first storage module 304 coupled to the one or more sensors 302 via an input/output bus 320 configured to transfer sensor data, a second storage module 312 coupled to the first storage module 304, a blur unit 310 coupled to both the first storage module 304 and the second storage module 312, and a user 318 coupled to the second storage module 312. The blur unit 310 may be the "blurring" application 208 of FIGS. 2A and 2B.

The first storage module 304 includes an intermediate storage/interface buffer 306 coupled to a blur validation module 308. The intermediate storage/interface buffer 306 may be the intermediate storage/interface buffer 204 of FIGS. 2A and 2B. The second storage module 312 includes a storage unit 314 coupled to a blur validation module 316. The storage unit 314 may be the storage unit 206 of FIGS. 2A and 2B. The first storage module 304 and the second storage module 312 may be configured to protect stored data such that the data stored in each respective storage module 304, 312 cannot be accessed by an external entity. The first storage module 304 may have read protection, such that a read of unblurred data is prohibited.

The blur unit 310 may be configured to corrupt or blur PII data of the image data from the one or more sensors 302, such that obfuscated sensor data is generated by the blur unit 310. Although the blur unit 310 is shown to be coupled to both the intermediate storage/interface buffer 306 and the storage unit 314, in other embodiments, the first storage module 304 and the second storage module 312 each include a blur unit 310. Furthermore, the data paths to and from the blur unit 310 and the blur unit 310 may be part of a read protected area of the memory-level read blocking of unblurred data system 300, such that the data being transferred to and from the blur unit 310 cannot be accessed by an external entity. The blurring or obfuscating by the blur unit 310 may be completed on-the-fly or offline, such that data may be blurred or obfuscated prior to being stored in the relevant data storage locations. Furthermore, in some embodiments, the blur unit 310 may be configured to retrieve data from the intermediate storage/interface buffer 306 and the storage unit 314.

The blur validation modules 308, 316 may be configured to generate a flag in response to identifying PII in the original sensor data or the obfuscated sensor data generated by the blur unit 310 and stored in the respective intermediate storage/interface buffer 306 or the storage unit 314. When a flag is generated for the obfuscated sensor data, the blur validation modules 308, 316 may be configured to return the obfuscated sensor data and the flag to the blur unit 310, such that the non-obfuscated PII sensor data may be obfuscated by the blur unit 310 and the PII is no longer identifiable.

The obfuscated sensor data is passed from the first storage module 304 to the second storage module 312 and from the second storage module 312 to the user 318 in a private (blurred) data format. Thus, rather than having multiple non-private (unblurred) data storage locations or data streams, the memory-level read blocking of unblurred data system 300 includes a single data stream passing non-private (unblurred) data, where the single data stream is between the one or more sensors and the first storage module 304.

Figure 4:
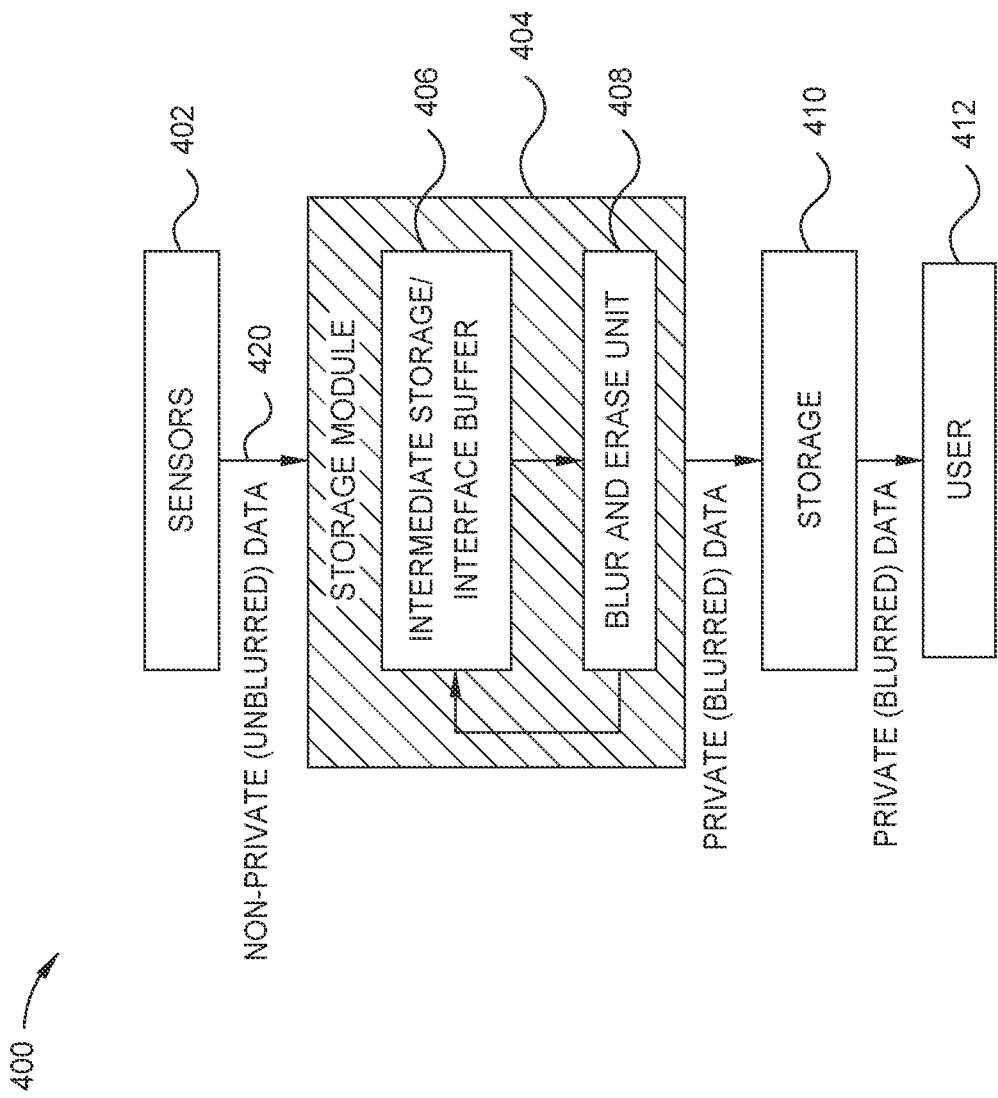
FIG. 4 depicts a schematic block diagram illustrating an intermediate storage disruptive read of unblurred data system, according to certain embodiments.

FIG. 4 depicts a schematic block diagram illustrating an intermediate storage disruptive read of unblurred data system 400, according to certain embodiments. The intermediate storage disruptive read of unblurred data system 400 includes one or more sensors 402 coupled to a storage module 404, where sensor data or image data is transferred from the one or more sensors 402 to the storage module 404 via an input/output bus 420. The sensor data or image data transferred via the input/output bus 420 is in a non-private (unblurred) data format, such that PII data is not obfuscated or blurred.

The storage module 404 may be configured to protect stored such that the data stored in the storage module 404 cannot be accessed by an external entity. The storage module 404 may have read protection, such that a read of unblurred data by an external entity without permission is prohibited. The storage module 404 includes an intermediate storage/interface buffer 406, which may be the intermediate storage/interface buffer 204 of FIG. 2, coupled to a blur and erase unit 408. It is understood that in some embodiments, the storage module 404 may include the blur and erase unit 408 and a storage unit 410 and exclude the intermediate storage/interface buffer 406. For example, if the interface, such as the interface 114 of FIG. 1, is one in which the data storage device, such as the data storage device 106 of FIG. 1, is the bus master (e.g., PCIe/NVMe), the intermediate storage/interface buffer 406 may reside together with the one or more sensors 402. Thus, the storage module 404 includes the blur and erase unit 408 and the storage unit 410.

The blur and erase unit 408 may be configured to obfuscate or blur PII data in the image data and rewrite the obfuscated image data back to the intermediate storage/interface buffer 406, such that the original image data stored in the intermediate storage/interface buffer 406 is erased and replaced with the obfuscated data. In some embodiments, the blur and erase unit 408 includes a blur validation module, such as the blur validation modules 308, 316 of FIG. 3. The obfuscated image data is transferred to the storage unit 410, which may be the storage unit 206 of FIGS. 2A and 2B. The obfuscated image data is provided to a user 412 from the storage unit 410.

In one non-limiting example, the blur and erase unit 408 modifies, blurs, or obfuscates a portion of the data, such as a size of about 32 B or 64 B in each 4 KB of sensor data stored in the intermediate storage/interface buffer 406. The modification, blur, or obfuscation of the sensor data may be large enough such that the original sensor data is not recoverable.

The obfuscated sensor data is passed from the storage module 404 to the storage unit 410 and from the storage unit 410 to the user 412 in a private (blurred) data format. Thus, rather than having multiple non-private (unblurred) data storage locations or data streams, the intermediate storage disruptive read of unblurred data system 400 includes a single data stream passing non-private (unblurred) data, where the single data stream is between the one or more sensors and the storage module 404.

Figure 5:
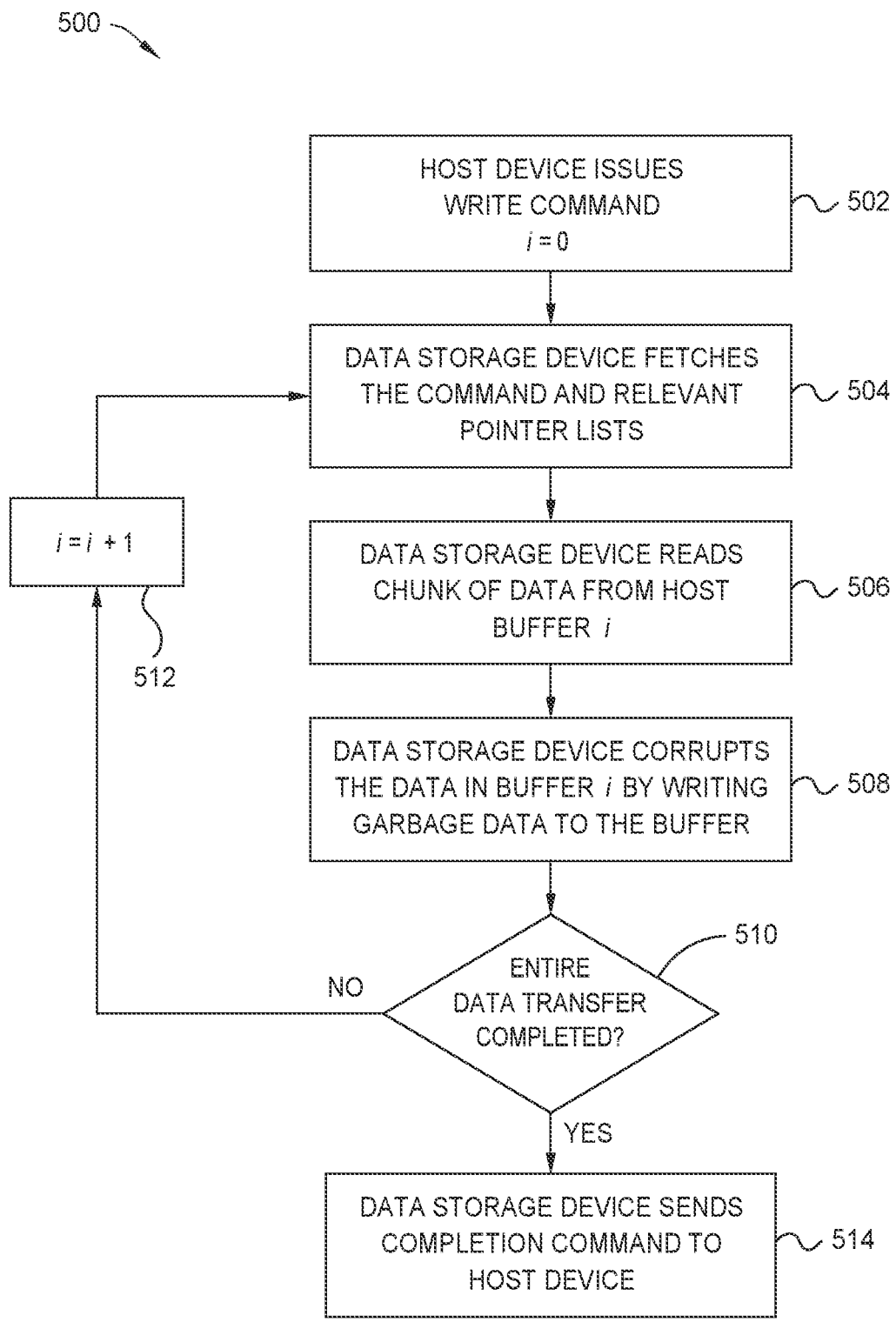
FIG. 5 depicts a schematic block diagram illustrating a method of a disruptive read of unblurred data of an NVMe write command flow, according to certain embodiments.

FIG. 5 depicts a schematic block diagram illustrating a method of a disruptive read of unblurred data of an NVMe write command flow 500, according to certain embodiments. The NVMe write command flow 500 may be implemented by the intermediate storage disruptive read of unblurred data system 400 of FIG. 4.

At block 502, a host device, such as the host device 104 of FIG. 1, issues a write command. The write command is associated with an initial starting location (i) of data stored in the intermediate storage/interface buffer 406. At block 504, the data storage device, such as the data storage device 106 of FIG. 1, utilizing a controller, such as the controller 108 of FIG. 1, or firmware fetches the write command and relevant pointer lists from the host device 104. In some examples, controller 108 may include one or more processors configured to execute the firmware. At block 506, the data storage device reads a chunk of data from a host buffer, such as the intermediate storage/interface buffer 406, at the location i. At block 508, the data storage device corrupts the data in the host buffer location i by writing garbage data to the host buffer. The corrupting and writing may be completed by the blur and erase unit 408 of FIG. 4. The garbage data may be written to the sensor data so as to overwrite the portion of the sensor data relating to PII data.

At block 510, the controller 108 or firmware determines if the entire data transfer associated with the write command has finished. If the data transfer has not finished, then at block 512, the location i is incremented to a new value for i, where the new i is defined as i=i+1. The NVMe write command flow 500 returns to block 504, where the data storage device 106 fetches the write command and relevant pointer lists. However, if the entire data transfer is completed at block 510, then the data storage device 106 sends a completion command to the host device 104 at block 514.

By implementing data protection techniques and obfuscating data at a location near the data source, personally identifying information may be protected from unwanted access, and the security of privacy-recording systems may be improved.

In one embodiment, a system for enforcing data privacy is disclosed, that includes an input/output coupled to a sensor configured to produce sensor data comprising personal identifying data, an intermediate storage configured to receive sensor data from the sensor; and a blur unit coupled to the intermediate storage and configured to identify personal identifying data of the sensor data, produce obfuscated sensor data by obfuscating at least a portion of the personal identifying data, and provide the obfuscated sensor data to the intermediate storage.

The intermediate storage further includes a blur validation unit configured to generate a flag responsive to identifying personal identifying data in the obfuscated sensor data. The system further includes a data storage device (DSD) configured to receive obfuscated sensor data from the intermediate storage, the DSD being coupled to the blur unit, the blur unit further configured to identify personal identifying data in the obfuscated sensor data. The DSD further includes a second blur validation unit configured to generate a flag if personal identifying data is identified in the obfuscated sensor data. The system further includes a user interface configured to provide obfuscated sensor data to a user. The DSD is a non-volatile data storage device. The blur unit is further configured to overwrite the personal identifying data. The intermediate storage is a volatile data storage device.

In another embodiment, a system for storing data is disclosed that includes an input/output coupled to a sensor, an intermediate storage (IS), a data storage device, and a processor configured to execute a method for enforcing data privacy. The method includes receiving sensor data from the sensor comprising personal identifying data at the IS, identifying the personal identifying data at the IS, and generating obfuscated sensor data at the IS by obfuscating at least a portion of the personal identifying data.

The method further includes validating the obfuscated sensor data with a blur validation unit of the IS device, generating a flag responsive to identifying personal identifying information identified in the obfuscated sensor data. The method further includes receiving, by the data storage device, the obfuscated sensor data, from the IS and identifying personal identifying data in the obfuscated sensor data in the data storage device. The method further includes, responsive to validating the obfuscated sensor data with a second blur validation unit, generating a flag indicating personal identifying data is identified in the obfuscated sensor data. The method further includes providing the obfuscated sensor data to a user interface. The data storage device is a non-volatile data storage device. The IS is a volatile data storage device.

In another embodiment, a controller for a data storage system is disclosed that includes a memory means for storing computer-readable instructions, and a processor means configured to read computer-readable instructions that cause the processor to execute a method for enforcing data privacy. The method includes receiving sensor data comprising personal identifying information at an intermediate storage (IS) means; obfuscate at least a portion of the sensor data comprising personal identifying information at the IS means, to generate obfuscated personal identifying information; and provide the sensor data to a data storage device (DSD) means.

The computer-readable instructions further cause the processor to overwrite the personal identifying information. The computer-readable instructions further cause the processor to validate the sensor data at the IS means and flag the sensor data, responsive to determining that the sensor data contains personal identifying information that is not obfuscated. The computer-readable instructions further cause the processor to obfuscate at least a portion of the sensor data that contains personal identifying data that is not obfuscated personal identifying information in the DSD, to generate additional obfuscated personal identifying information. The computer-readable instructions further cause the processor to overwrite personal identifying information.

While the foregoing is directed to embodiments of the present disclosure, other and further embodiments of the disclosure may be devised without departing from the basic scope thereof, and the scope thereof is determined by the claims that follow.

What is claimed is:

1. A system for enforcing data privacy, comprising:
a memory for storing computer-readable instructions; and
a processor configured to read and execute the computer-readable instructions;
an Input/Output (I/O) coupled to a sensor configured to produce sensor data comprising personal identifying data;
a first storage module coupled to the sensor, wherein the first storage module comprises:
an intermediate storage/interface buffer configured to receive sensor data from the sensor, wherein the intermediate storage/interface buffer is configured to protect the received sensor data such that the received sensor data cannot be accessed by an external entity; and
a blur validation module coupled to the intermediate storage/interface buffer and configured to generate a flag in response to identifying the personal identifying data in the received sensor data;
a second storage module coupled to the first storage module, wherein the second storage module comprises:
a storage unit; and
a blur validation module configured to generate a flag in response to identifying the personal identifying data in an obfuscated data; and
a blur unit coupled to the first storage module and the second storage module, and configured to identify the personal identifying data of the sensor data, produce the obfuscated sensor data by obfuscating at least a portion of the personal identifying data, and provide the obfuscated sensor data to the intermediate storage/interface buffer and the storage unit of the second storage module.

2. The system of claim 1, wherein the blur unit is further configured to identify the personal identifying data in the obfuscated sensor data.

3. The system of claim 2, further comprising a user interface configured to provide the obfuscated sensor data to a user.

4. The system of claim 1, wherein the second storage module is a non-volatile data storage device.

5. The system of claim 1, wherein the blur unit is further configured to overwrite the personal identifying data.

6. The system of claim 1, wherein the intermediate storage/interface buffer is a volatile data storage device.

7. A method for enforcing data privacy, comprising:
producing, by a sensor, sensor data comprising personal identifying data;
receiving the sensor data from the sensor at an Intermediate Storage/Interface Buffer (IS/IB) coupled to the sensor;
protecting, by the (IS/IB), the received sensor data such that the received sensor data cannot be accessed by an external entity;
generating, by a blur validation module coupled to the (IS/IB), a flag in response to identifying the personal identifying data in the received sensor data, wherein the blur validation module and the (IS/IB) are coupled to a first storage module coupled to the sensor;
generating, by a second blur validation module coupled to a second storage module, a flag in response to identifying the personal identifying data in an obfuscated data, wherein the second storage module is coupled to the first storage module;
identifying the personal identifying data at a blurring application coupled to the first storage module and the second storage module;
generating the obfuscated sensor data at the blurring application by obfuscating at least a portion of the personal identifying data; and
providing the obfuscated sensor data to the (IS/IB) and to a storage unit belong to the second storage module.

8. The method of claim 7, further comprising: identifying the personal identifying data in the obfuscated sensor data provided in the storage unit.

9. The method of claim 8, further comprising providing the obfuscated sensor data to a user interface.

10. The method of claim 7, wherein the second data storage module is a non-volatile data storage device.

11. The method of claim 7, wherein the IS/IB is a volatile data storage device.

12. A controller for a data storage system for enforcing data privacy, comprising:
a memory for storing computer-readable instructions; and
a processor configured to read the computer-readable instructions that when executed cause the processor to:
produce, by a sensor, sensor data comprising personal identifying data;
receive the sensor data comprising the personal identifying information at an Intermediate Storage/Interface Buffer (IS/IB) coupled to the sensor;
protect, by the (IS/IB), the received sensor data such that the received sensor data cannot be accessed by an external entity;
generate, by a blur validation module coupled to the (IS/IB), a flag in response to identifying the personal identifying data in the received sensor data, wherein the blur validation module and the (IS/IB) are coupled to a first storage module coupled to the sensor;
generate, by a second blur validation module coupled to a second storage module, a flag in response to identifying the personal identifying data in an obfuscated data, wherein the second storage module is coupled to the first storage module;
identifying the personal identifying data at a blurring application coupled to the first storage module and the second storage module;
obfuscate at least a portion of the sensor data comprising the personal identifying information at the blurring application, to generate the obfuscated sensor data; and
provide the obfuscated sensor data to the (IS/IB) and to a storage unit belong to the second storage module.

13. The controller of claim 12, wherein the computer-readable instructions further cause the processor to overwrite the personal identifying information.

14. The controller of claim 12, wherein the computer-readable instructions further cause the processor to:
obfuscate at least a portion of the sensor data that contains personal identifying data that is not obfuscated personal identifying information, to generate additional obfuscated personal identifying information.

15. The controller of claim 14, wherein the computer-readable instructions further cause the processor to overwrite the personal identifying information that is not obfuscated personal identifying information.

* * * * *